Figures 1, 2:
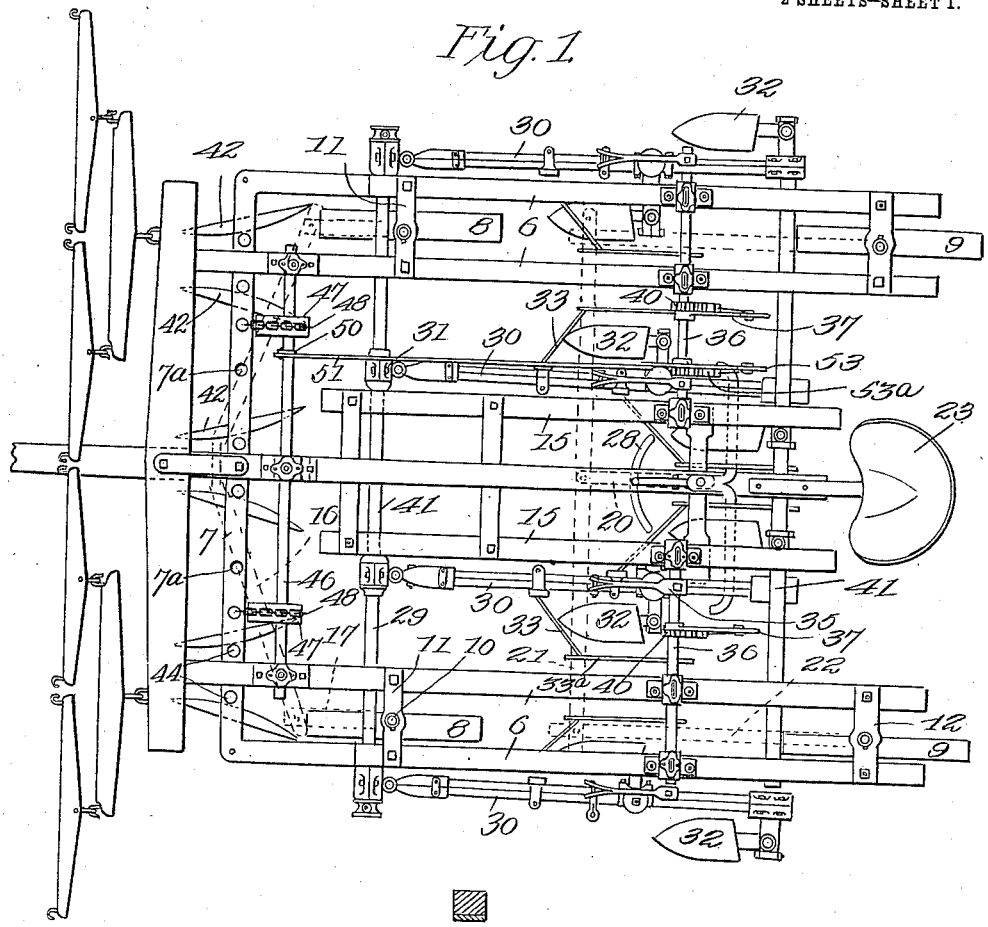

R. HAMILTON.
COTTON CHOPPER AND CULTIVATOR.
APPLICATION FILED JULY 2, 1912.

1,059,936.

Patented Apr. 22, 1913.

2 SHEETS—SHEET 1.

WITNESSES
Samuel E. Wade,
F. C. Barry

INVENTOR
ROBERT HAMILTON
BY Munn & Co.
ATTORNEYS

R. HAMILTON.
COTTON CHOPPER AND CULTIVATOR.
APPLICATION FILED JULY 2, 1912.
1,059,936.
Patented Apr. 22, 1913.
2 SHEETS—SHEET 2.
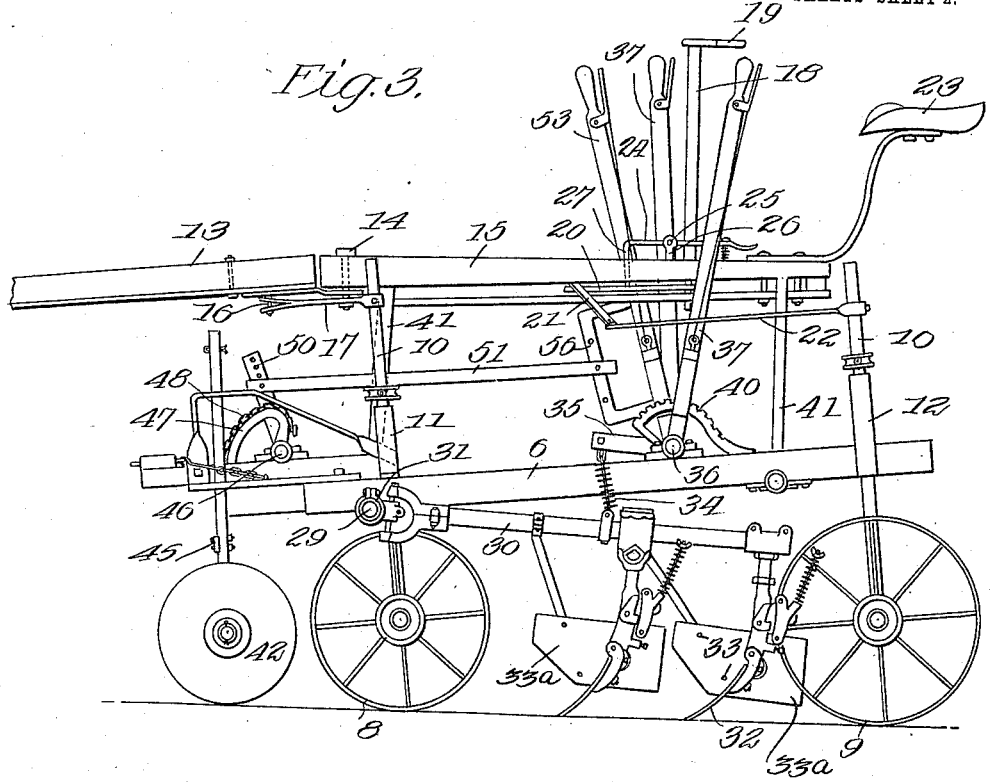
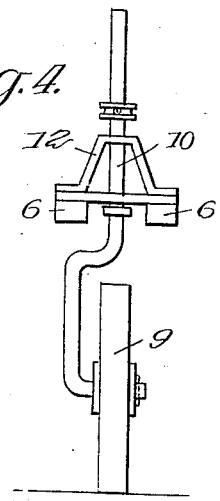
WITNESSES
Samuel E. Wade.
F. C. Barry
INVENTOR
Robert Hamilton
BY Munn & Co.
ATTORNEYS

UNITED STATES PATENT OFFICE.

ROBERT HAMILTON, OF PENSACOLA, FLORIDA.

COTTON CHOPPER AND CULTIVATOR.

1,059,936.      Specification of Letters Patent.      Patented Apr. 22, 1913.

Application filed July 2, 1912. Serial No. 707,166.

*To all whom it may concern:*

Be it known that I, ROBERT HAMILTON, a citizen of the United States, residing at Pensacola, in the county of Escambia and State of Florida, have invented certain new and useful Improvements in Cotton Choppers and Cultivators, of which the following is a specification.

This invention relates to combined cotton choppers and cultivators, and has for its principal object to provide improved means for controlling cutting disks carried by the machine; also to provide certain novel constructions and combinations of other parts as will more fully appear from the following description and the accompanying drawings.

In the drawings—Figure 1 is a plan of the machine. Fig. 2 is a vertical section thereof on the line 2—2 of Fig. 1. Fig. 3 is a side elevation. Fig. 4 is a detail elevation illustrating the mounting of one of the rear wheels.

The lower or main frame of the machine comprises four longitudinal bars or beams 6, with a connecting cross bar 7 at the front. This frame is carried on front wheels 8 and rear wheels 9, each wheel being a swiveling or caster wheel with a turning standard or post 10. The front wheel posts are mounted to turn in supports or brackets 11, and the rear wheel posts in brackets 12. The front wheels are steered by the tongue 13 which is pivoted at 14 to the front end of an upper frame 15, and connected to the respective posts by links 16 and lever arms 17, the latter being fastened on the upper ends of the posts. The rear wheels 10 are steered by means of a steering post 18 with a handle 19 at the top, said post carrying, at its lower end, an arm 20 connected by links 21 to arms 22 fastened to the rear wheel posts. The seat 23 is mounted on the rear end of the upper central frame 15, in position to operate the handle 19, and to hold the rear wheels in central position I provide a spring latch 24 which is pivoted at 25 to a bracket 26 on the frame. The rear end of this latch is located in convenient position for operation by the foot of the driver, and its front end is bent down as indicated at 27 to engage in a hole at the middle of a circle iron 28 carried by the lever 20, and normally the end of the latch will engage in the hole and hold the rear wheels in straight position. When it is desired to turn the rear wheels the latch is lifted and the wheels may then be turned by the post 18.

Members 29 extend across the sides of the main frame 6, and the front ends of two pairs of beams 30 are pivotally connected thereto as indicated at 31. Each of these beams carries cultivator blades or shovel plows 32, and also rods 33 covering fenders 33ª if desired, these cultivator beams and appliances being of known construction, and connected by spring links 34 to arms 35 projecting from a pair of rock shafts 36, one of which is located at each side of the machine, each rock shaft being controlled by a lever 37 by means of which the shaft 36 may be turned to raise or lower the cultivator beams, and the hand levers are equipped with suitable latches to engage notched segments 40 to hold the cultivator beams in adjusted position. The central upper frame 15 is supported by forward and rear arched supports 41, the lower ends of which are rigidly connected to the main frame bar 6, and the lower portions of this forward support 41 constitute the members 29 beforementioned.

Three pairs of cutting disks 42 are shown applied to the machine, to cut three rows at each operation. Each disk is mounted on a spindle 43 at the lower end of a post 44, and these posts are connected by and fastened to a cross bar 45, and the upper ends of the posts work through holes in the front cross piece 7 of the main frame. 46 is a shaft mounted in bearings on the frame provided with segmental levers 47 connected by chains 48 to the cross bar 45, and when the shaft 46 is turned the bar 45 and the disks carried thereby are raised and lowered, whereby said disks can be made to cut deep or shallow, or may be lifted entirely out of the ground as in turning or traveling. The shaft 46 has an arm 50 connected by a rod 51 to a bent brace or bar 52 on a lever 53 which is fulcrumed on the right hand shaft section 36, and by manipulation of this lever which is adapted to be adjustably locked on a segment 53ª the shaft 46 may be turned to raise or lower the disks.

Means are provided for shifting the two outer pairs of disks toward the center pair, and to this end additional holes 7ª are provided in the bar 7, and when it is desired to shift the two outer pairs of disks, the segments 47 and chains 48 are moved along the shaft 46 and bar 45 to extend through the holes 7ª, and the two outer pairs of disks are then disconnected from their positions, as shown in Fig. 3, and moved along, or toward the middle, to work through the next adjacent pairs of holes in the bar 7. The middle pair of disks requires no lateral adjustment.

By the means described the disks may be adjusted to desired position laterally, and may also be raised or lowered in the operation of the machine. Also the steering of the front wheels, and of the rear wheels when necessary, may be effected by the means described.

I claim:

The combination of a frame comprising lower side portions and an upper central portion, a seat mounted at the rear of the central frame portion, caster wheels mounted in the forward and rear portions of the lower side frames, a tongue pivoted to the forward end of the upper central frame portion and having connection with the front caster wheels for controlling the latter, arms extending forwardly from the rear caster wheels, an upright steering post mounted in the central frame portion in front of the seat, and having a handle at its upper end, a forwardly extending arm at the lower end of said steering post, and links connecting the said post arm with the said rear caster wheel arms.

ROBERT HAMILTON.

Witnesses:
W. S. LURTON,
D. A. WEE.

Copies of this patent may be obtained for five cents each, by addressing the "Commissioner of Patents, Washington, D. C."